United States Patent [19]

Hall

[11] 4,184,783

[45] Jan. 22, 1980

[54] READILY DISENGAGABLE CLEVIS

[75] Inventor: Gerald H. Hall, North Andover, Mass.

[73] Assignee: General Electric Company, Lynn, Mass.

[21] Appl. No.: 900,849

[22] Filed: Apr. 26, 1978

[51] Int. Cl.² .................. F16C 11/06; F16D 1/12; F16J 1/16

[52] U.S. Cl. .................................. 403/157; 403/376

[58] Field of Search ............... 403/157, 158, 154, 155, 403/161, 168, 163, 376, 388

[56] References Cited

U.S. PATENT DOCUMENTS

| 2,399,581 | 4/1946 | Spooner | 403/157 X |
| 2,515,807 | 7/1950 | Spooner | 403/157 X |
| 2,704,681 | 3/1955 | Fischer | 403/157 X |
| 2,847,238 | 8/1958 | Bolling | 403/157 X |
| 3,079,188 | 2/1963 | Oswold | 403/157 X |
| 3,080,184 | 3/1963 | Hays | 403/376 X |
| 3,298,723 | 1/1967 | Damm | 403/157 X |
| 3,357,294 | 12/1967 | Taylor | 403/376 X |
| 3,471,116 | 10/1969 | Luebbert et al. | 403/157 X |
| 3,525,448 | 8/1970 | Bauer | 403/157 X |
| 3,531,144 | 9/1970 | Bizilia | 403/157 X |
| 3,773,360 | 11/1973 | Timbers | 285/307 |
| 4,034,946 | 7/1977 | Zimmer | 403/157 X |

FOREIGN PATENT DOCUMENTS

1784004 7/1971 Fed. Rep. of Germany ........... 403/161

*Primary Examiner*—Wayne L. Shedd
*Attorney, Agent, or Firm*—Henry J. Policinski; Derek P. Lawrence

[57] ABSTRACT

A quick disconnect assembly is disclosed for joining two members. The assembly is comprised of two circular steel bushings, a cylindrical steel pin and a steel spring ring. The bushings include axial circular openings and are each disposed in one of the legs of the first member so that they are axially aligned. The pin includes an annular groove in which is disposed the spring ring. The second member has a circular bearing at one end which has a circular opening extending axially therethrough.

Connection of the first and second members is accomplished by positioning the second member between the legs of the first member so that the bearing opening is in axial alignment with the bushings openings. The pin is then inserted into the three aligned openings from one end. Insertion is aided by chamfers which help to compress the spring ring. When the pin is fully inserted, the spring ring expands because of its resiliency and abuts against an annular shoulder in the opening of the first bushing to retain the pin in position.

Disconnection is accomplished by pulling the pin out of the openings. Pin removal is impeded by the annular shoulder. A second annular shoulder in the other bushing acts to retain the pin in a partially withdrawn position.

8 Claims, 4 Drawing Figures

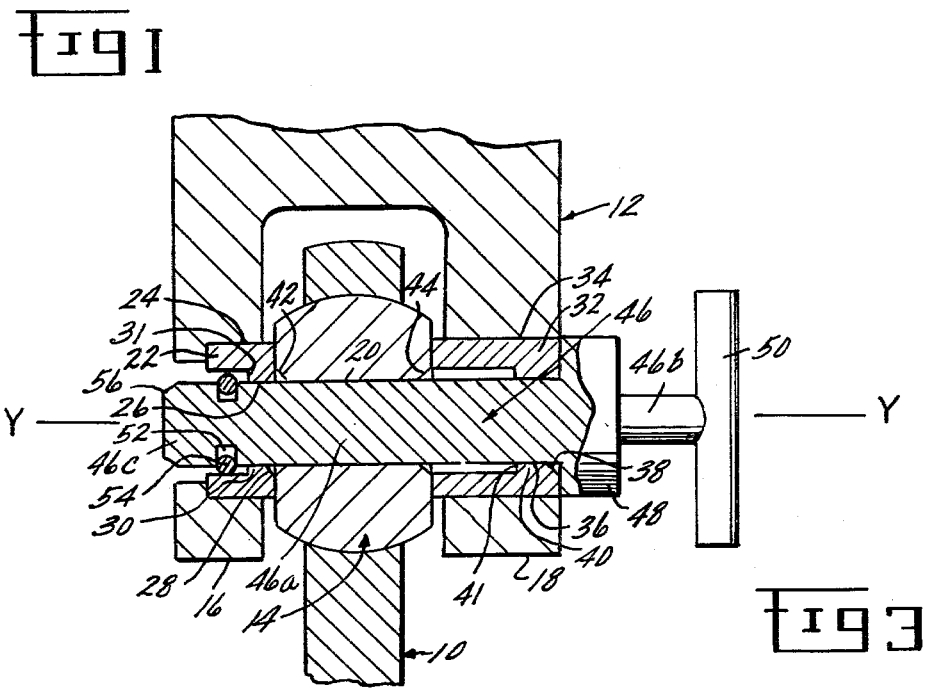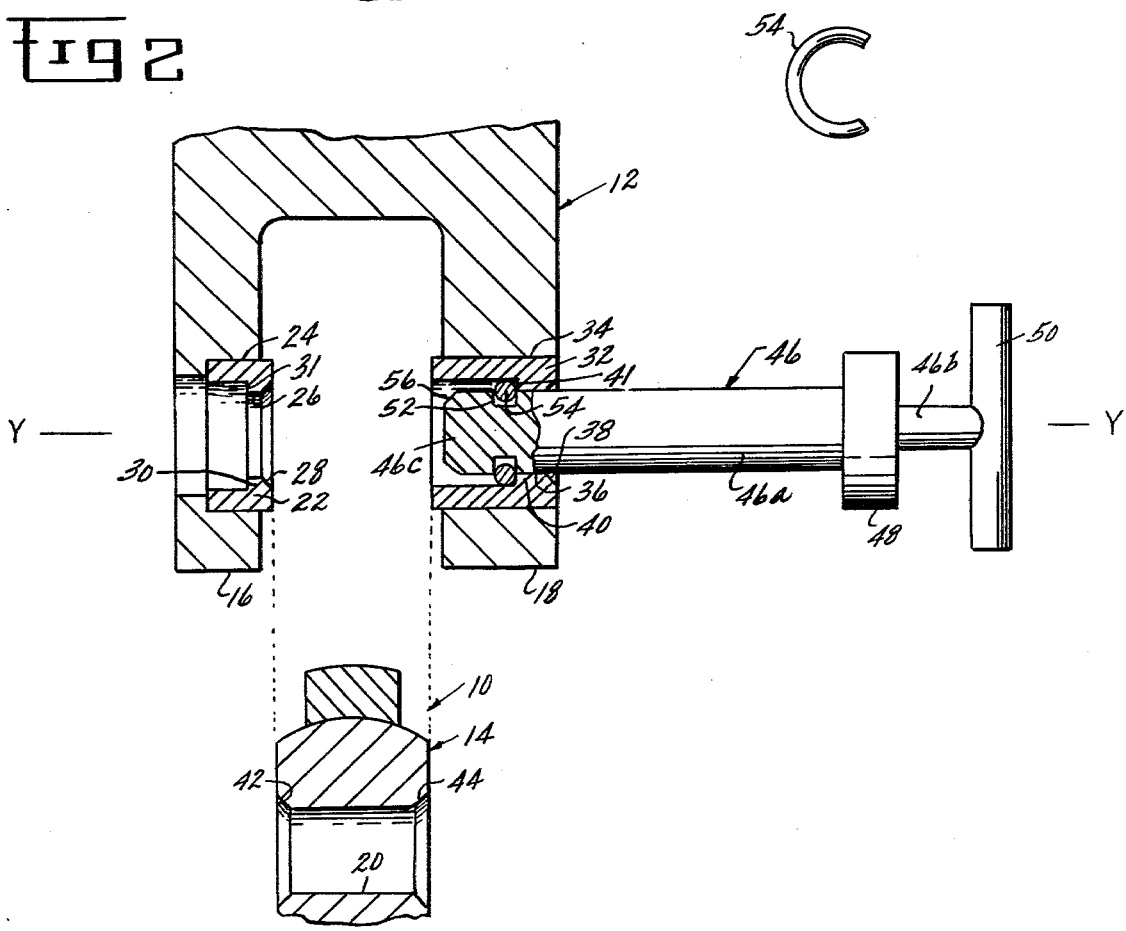

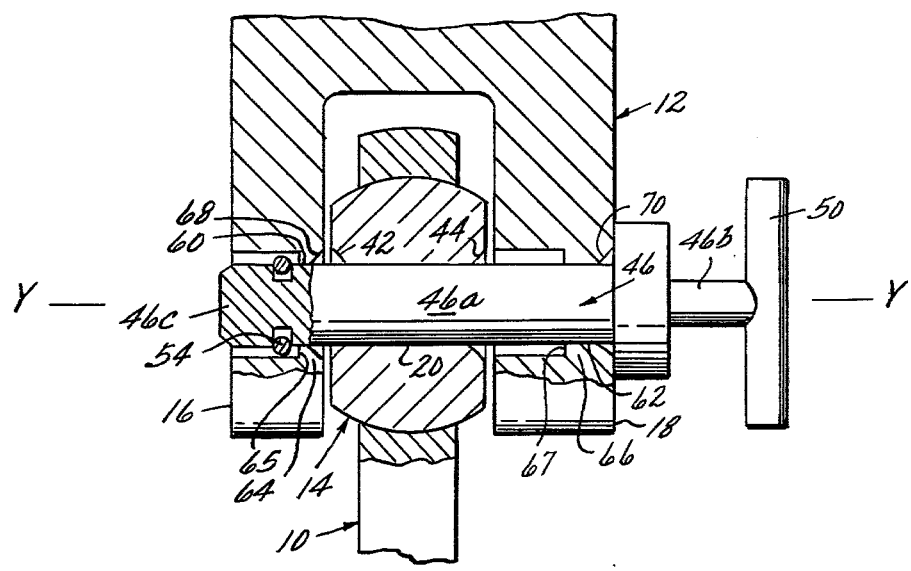

READILY DISENGAGABLE CLEVIS

BACKGROUND OF THE INVENTION

1. Field of the Invention

This invention relates to quick disconnect assemblies for joining two members and, more particularly, to a quick disconnect assembly for joining a rod and a clevis.

2. Description of the Prior Art

In the prior art a commonly used quick release pin for joining a rod and a clevis is comprised of a tubular shank member, a pair of steel balls and a spring-loaded cylindrical member. The cylindrical member has an annular groove and is disposed to move axially within the tubular shank. The balls are disposed within a pair of bores extending radially through the tubular shank.

In the installed position, when the prior art pin is fully inserted within openings in both clevis legs and in the rod, the cylindrical member is axially positioned by the spring to force the balls radially outwardly from the tubular member and into engagement with an annular groove within the opening in one of the clevis legs, thereby locking the pin in place. Removal or insertion of the pin is accomplished by depressing the cylindrical member against the spring bias into the tubular member to a position where the groove on the cylindrical member aligns with the balls. The action releases the outward force on the balls and allows them to retract into the radial bores in the tubular member, thereby disengaging them from the groove in the clevis leg and allowing the pin to be slidably removed from the clevis and rod openings.

Although this prior art quick release pin is generally adequate for many applications, it suffers from several particular shortcomings which preclude its use under certain conditions. Because of its inherent method of operation, the prior art pin contains a radially enlarged portion to provide for depressing the cylindrical member and for gripping the pin for removal and insertion. This causes the pin to be excessively large, thereby denying its use in small areas. The prior art pin is also subject to freezing, rendering it useless under adverse environmental conditions. In addition, the cost of manufacturing and assembling the prior art pin makes it economically impractical for certain applications. All of these shortcomings as well as others are overcome by the present invention.

An object of the present invention is to provide a simplified quick disconnect assembly for joining two members which can be made small for use in applications where space is limited.

A further object of the present invention is to provide such a quick disconnect assembly which may be inexpensively produced in volume quantities.

A further object of the present invention is to provide such a quick disconnect assemby which is not susceptible to failure under adverse environmental conditions.

A further object of the present invention is to provide such a quick disconnect assembly which will prevent pin loss and facilitate reassembly.

SUMMARY OF THE INVENTION

Briefly stated, there is provided, in accordance with the present invention, a quick disconnect assembly for joining two members being comprised of two circular steel bushings, a cylindrical steel pin and a steel spring ring. The first bushing includes a circular opening extending axially therethrough and is disposed within a first leg of the first member. The second bushing includes a circular opening extending axially therethrough and is disposed within a second leg of the first member. Both of the bushing openings are axially aligned. The pin includes an annular groove in which is disposed the spring ring. The second member has a circular bearing at one end which has a circular opening extending axially therethrough.

Connection of the first and second members is accomplished by positioning the second member between the legs of the first member so that the bearing opening is in axial alignment with the bushing openings. The pin is then inserted into the three aligned openings from one end. Pin insertion is aided by chamfers on the insertion side of the bushing and bearing openings which help compress the spring ring. When the pin is fully inserted, the spring ring expands because of its resilience and abuts against an annular shoulder in the interior of the opening in the first bushing.

Disconnection is accomplished by pulling the pin out of the openings and removing the rod. Pin removal is impeded by the annular shoulder which inhibits the compression of the spring ring. A second annular shoulder located in the interior of the opening in the second bushing acts to retain the pin in a partially withdrawn position.

DESCRIPTION OF THE DRAWINGS

FIG. 1 is a longitudinal cross-sectional elevation of the preferred embodiment of quick disconnect assembly of the present invention with the pin in a fully inserted position.

FIG. 2 is a view similar to FIG. 1, but with the pin in a partially withdrawn position.

FIG. 3 is a plan view showing the details of the spring ring employed in the present invention.

FIG. 4 is a longitudinal cross-sectional elevation of an alternate embodiment of the present invention.

DESCRIPTION OF THE PREFERRED EMBODIMENT

Referring to FIGS. 1 and 2, there are shown a first member or clevis 12 and a second member or rod 10 adapted to be held in assembled relation by the quick disconnect assembly of the present invention. The clevis 12 may be made of aluminum or any other suitable rigid material and has two legs 16 and 18 at one end. The rod 10 may be made of steel or any other suitable material and includes an end bearing 14 at one end. The end bearing 14 has a generally circular opening 20 extending axially through the center and is positioned between the clevis legs 16 and 18. Axially as used herein means a direction along the axis Y—Y shown in FIG. 1.

A circular steel bushing 22 is adapted to reside within a circular opening 24 near the end of clevis leg 16. A second circular steel bushing 32 is adapted to reside within a circular opening 34 near the end of clevis leg 18. Bushings 22 and 32 have axially aligned circular openings 26 and 36 extending axially through their respective centers. The rod 10 is positioned between clevis legs 16 and 18 so that the bearing circular opening 20 axially aligns with bushing circular openings 26 and 36.

A circular pin 46 constituted of steel or any other suitable rigid material has a shank portion 46a, a head portion 46b and a tip end 46c. The shank portion 46a is receivable within bushing circular openings 26 and 36 and within circular opening 20 in order to connect the clevis 12 to the rod 10. The head portion 46b has a first circular annular flange member 48 having a diameter which is slightly larger than that of the shank portion 46a. The flange member 48 acts as a stop means for limiting the insertion of the shank portion 46a by abutting against bushing 32 when the shank portion 46a is fully inserted into circular openings 36, 20 and 26, as shown in FIG. 1. Alternatively, flange member 48 could be made slightly larger than is shown in FIG. 1 so that it would abut against the side of clevis leg 18, to limit the insertion of shank portion 46a. A second circular annular flange member 50 having a diameter which is slightly larger than that of flange member 48 is located on the end of the head portion 46b and serves as a convenient handle for holding the pin 46 during insertion or withdrawal.

The shank portion 46a includes an annular groove 52 near tip end 46c. A resilient member 54 is disposed within the annular groove 52. In the form of the invention shown, the resilient member 54 is an arcuate flat spring ring, as best seen in FIG. 3, constructed of an approximately 270° arc of stainless steel spring wire or any other suitable resilient material.

The interior of the circular opening 26 in bushing 22 includes a sharp-edged annular shoulder 30 which is engageable by the spring ring 54 in order to retain the pin 46 in an inserted position as shown in FIG. 1. Due to sharp edge 31, shoulder 30 also acts to inhibit the compression of the spring ring 54, thereby necessitating a high withdrawal force in order to remove the pin 46 from bushing 22. In this manner, inadvertent or accidental removal of the pin 46 is precluded.

The interior of the circular opening 36 in bushing 32 includes a second sharp-edged annular shoulder 40 which is engageable by the spring ring 54 in order to retain the pin 46 in a partially withdrawn position as shown in FIG. 2. Due to sharp edge 41, the shoulder 40 also acts to inhibit the compression of the spring ring 54, thereby necessitating a high withdrawal force in order to remove the pin 46 from bushing 32. In this manner, inadvertent or accidental removal of the pin 46 is precluded.

The bushing circular openings 26 and 36 each contain an annular lead-in chamfer 28 and 38, respectively. These chamfers, when engaged by the spring ring 54, facilitate compression of the spring ring and thereby provide for easy insertion of the pin 46 into bushings 32 and 22. The bearing circular opening 20 has annular chamfers 42 and 44 on each side which are engageable by the spring ring 54 in order to facilitate the compression of spring ring 54 for easy movement of the pin 46 through the bearing 14 during insertion and withdrawal. The tip end 46c of the pin 46 also contains an annular chamfer 56 in order to facilitate insertion of the tip end 46c into the circular opening 36 in bushing 32.

In operation, once the rod 10 is positioned between clevis legs 16 and 18 so that circular openings 36, 20 and 26 are properly aligned, the tip end 46c of the pin 46 is inserted into bushing circular opening 36 and the shank portion 46a of pin 46 is simply pushed into circular openings 36, 20 and 26 until the flange member 48 abuts bushing 32. The initial insertion of the pin 46 is aided by chamfer 56. Chamfers 38, 44 and 28 all act to facilitate the compression of spring ring 54 as the pin 46 moves into circular openings 36, 20 and 26, respectively, thereby resulting in a low pin installation force.

When the flange member 48 abuts bushing 32, the pin 46 is in a fully inserted position as shown in FIG. 1 and the spring ring 54 has expanded to its uncompressed position in which it extends beyond the diameter of the shank 46a. In this position the spring ring 54 will engage the shoulder 30 upon any rightward movement of the pin 46, thereby preventing any accidental dislodgement of the pin 46. Leftward movement of the pin is effectively prevented by the engagement of the flange member 48 with the bushing 32.

As noted above, insertion of the pin is accomplished by a simple pushing motion. There is no need to perform any additional functions which had been required in the prior art.

Removal of the pin 46, when desired, is easily accomplished by pulling outwardly on the flange member 50 so that the spring ring 54 abuts with shoulder 30 and is compressed. Since shoulder 30 is sharp-edged, rather than chamfered, the withdrawal force required to compress the spring ring 54 is much greater than that required for pin insertion. Once the spring ring 54 is compressed the pin 46 may easily be withdrawn from bushing 22. Chamber 42 facilitates the compression of the spring ring 54 for an equally easy withdrawal of pin 46 through bearing 14.

Once the pin 46 has been removed from bushing 22 and the bearing 14 to the position shown in FIG. 2, the rod 10 may be removed from its position between clevis legs 16 and 18 for servicing. The pin 46 will be retained in its partially withdrawn position within bushing 32 by the spring ring 54 and shoulder 40. This is a highly desirable feature because not only does it prevent the pin from falling out and being potentially lost, but it also provides for easier reassembly of the rod and clevis since the pin is already lined up in the bushing opening.

Complete removal of the pin 46, if desired, is accomplished by pulling outwardly on the flange member 50 so that the spring ring 54 is compressed within the inner diameter of bushing 32. Since shoulder 40 is sharp-edged rather than chamferred, the withdrawal force required will also be much greater than that which was required for pin insertion. Once the spring ring 54 is compressed, the pin 46 may easily be withdrawn from bearing 32.

ALTERNATE EMBODIMENT

Referring now to FIG. 4, there is shown an alternate embodiment of the quick disconnect assembly of the present invention. Rod 10, clevis 12, and bearing 14, circular pin 46 and spring ring 54 are essentially as described in detail above. Clevis legs 16 and 18 contain axially aligned circular openings 60 and 62 respectively extending axially therethrough. Circular openings 60 and 62 each contain an annular lead in chamfer 68 and 70 respectively to facilitate compression of the spring ring 54 for easy insertion of the pin 46.

The interiors of circular openings 60 and 62 include sharp-edged annular shoulders 64 and 66 respectively. Shoulder 64 is engageable by the spring ring 54 to retain the pin 46 in an inserted position as shown in FIG. 4. Due to sharp edge 65, shoulder 64 also acts to inhibit the compression of the spring ring 54 thereby necessitating a high withdrawal force to remove the pin 46 from the circular opening 60. Likewise, shoulder 66 is engageable by the spring ring 54 in order to retain the pin 46 in a partially withdrawn position (not shown). Due to sharp edge 67, shoulder 66 also acts to inhibit the compression of the spring ring 54 thereby necessitating a high withdrawal force in order to remove the pin 46 from the circular opening 62. In this manner, inadvertent or accidental removal of the pin 46 is precluded.

The operation of this alternate embodiment of the present invention is essentially as described in detail above.

From the foregoing description it can be seen that in either embodiment heretofore shown the present invention provides a quick disconnect assembly for joining a rod and clevis which can be made as small as is necessary for a particular operation while still maintaining maximum load-carrying capacity. Because of its simple push/pull method of operation with a minimum of moving parts, this assembly is much less likely to be affected by adverse environmental operating conditions. A feature of this invention is that the pin may be retained in a partially withdrawn position thereby effectively preventing loss of the pin and facilitating reassembly. In addition, because of its overall simplicity, the present invention is highly suitable for automated volume production, thereby making it much less expensive to produce and use.

It will be obvious to one skilled in the art that changes can be made to the above-described invention without departing from the broad inventive concepts thereof. It is to be understood, therefore, that this invention is not limited to the particular embodiments disclosed, but it is intended to cover all modifications which are within the spirit and scope of the invention as claimed.

What is claimed is:

1. A quick disconnect assembly for joining a first and a second member comprising:
   (a) a first opening extending axially through a first leg of said first member,
   (b) a second opening extending axially through a second leg of said first member, said second opening being axially aligned with said first opening;
   (c) said second member having a third opening extending therethrough, said second member being positioned between said legs of said first member so that said third opening is axially aligned with said first and second openings;
   (d) a pin receivable within each of said openings, said pin having a tip at one end and a head at the other end, said tip end being inserted into each of said openings from said second opening, said pin further having a groove near said tip end;
   (e) a resilient member received in said groove;
   (f) said first opening further including first means engageable by said resilient member to retain said pin in an inserted position within said first opening, said first means cooperable with said resilient member to require a force for withdrawing said pin from said first opening;
   (g) said second opening further including second means engageable by said resilient member to retain said pin in a partially withdrawn position within said second opening; and
   (h) said first opening including a first chamfer facing the head end of said pin when said pin is inserted in side opening, said first chamfer facilitating compression of said resilient member during each insertion of said pin, said first chamfer cooperable with said resilient member to require a force for insertion of said pin into said first opening, said withdrawal force being greater than said insertion force.

2. A quick disconnect assembly for joining a first and a second member comprising:
   (a) a first bushing disposed within a first leg of said first member, said bushing having a first opening extending axially therethrough;
   (b) a second bushing disposed within a second leg of said first member, said second bushing having a second opening extending axially therethrough, said second opening being axially aligned with said first opening;
   (c) said second member having a third opening extending therethrough, said second member being positioned between said legs of said first member so that said third opening is axially aligned with said first and second openings;
   (d) a pin receivable within each of said openings, said pin having a tip at one end and a head at the other end, said tip end being inserted into each of said openings from said second opening, said pin further having a groove near said tip end;
   (e) a resilient member received in said groove;
   (f) said first bushing further including first means engageable by said resilient member to retain said pin in an inserted position within said first bushing, said first bushing cooperable with said resilient member to require a force for withdrawing said pin from said first bushing;
   (g) said second bushing further including second means engageable by said resilient member to retain said pin in a partially withdrawn position within said second bushing; and
   (h) said first bushing including a first chamfer facing the head end of said pin when said pin is inserted in said bushing said first chamfer facilitating compression of said resilient member during each insertion of said pin, said first chamfer cooperable with said resilient member to require a force for insertion of said pin into said first opening, said withdrawal force being greater than said insertion force.

3. The quick disconnect assembly of claim 2 wherein:
   (a) said first member is a clevis; and
   (b) said second member is a rod.

4. The quick disconnect assembly of claims 1, 2 or 3 wherein:
   (a) said first means comprises a first shoulder located within said first opening, said shoulder being positioned to be abutted by said resilient member; and
   (b) said second means comprises a second shoulder located within said second opening, said second shoulder being positioned to be abutted by said resilient member when said pin is in the partially withdrawn position.

5. The quick disconnect assembly of claim 4, wherein said resilient member is comprised of an arcuate flat spring ring, said spring ring being compressible within said groove during insertion and withdrawal of said pin, said spring ring being uncompressed when said pin is fully inserted.

6. The quick disconnect assembly of claim 1 wherein said spring ring comprises an arc of approximately 270° of steel spring wire.

7. The quick disconnect assembly of claim 6 wherein said head end of said pin includes stop means for limiting the insertion of said pin.

8. A quick disconnect assembly for joining a first and second member comprising:
   (a) a first opening extending axially through a first leg of said member;

(b) a second opening extending axially through a second leg of said first member, said second opening being axially aligned with said first opening;

(c) said second member having a third opening extending therethrough, said second member being positioned between said legs of said first member so that said third opening is axially aligned with said first and second openings;

(d) a pin receivable within each of said openings, said pin having a tip at one end and a head at the other end, said tip end being inserted into each of said openings from said second opening, said pin having a groove near said tip end;

(e) a resilient member received in said groove;

(f) said first opening further including a first shoulder located within said first opening, said shoulder being positioned to be abutted by said resilient member to retain said pin in an inserted position within said first opening, said first shoulder cooperable with said resilient member to require a force for withdrawing said pin from said first opening;

(g) said second opening further including a second shoulder located within said second opening, said second shoulder being positioned to be abutted by said resilient member to retain said pin in a partially withdrawn position within said second opening, said second shoulder cooperable with said resilient member to require a force for withdrawing said pin from said second opening;

(h) said first and second openings including first and second chamfers facing the head end of said pin when said pin is inserted in said openings, said first chamfer facilitating compression of said resilient member during each insertion of said pin, said first and second chamfer each cooperable with said resilient member to require a force for insertion of said pin in to each of said first and second openings respectively;

(i) said third opening further including third and fourth oppositely facing chamfers disposed so as to facilitate the compression of said resilient member for easy movement of said pin through said third opening during both insertion and withdrawal, said third and fourth chamfers each cooperable with said resilient member to require a force for inserting said resilient member into said third opening; and (j) each of said withdrawal forces being greater than each of said insertion forces.

* * * * *